(12) United States Patent
Russ

(10) Patent No.: US 7,812,562 B2
(45) Date of Patent: Oct. 12, 2010

(54) METHOD AND APPARATUS FOR HIGH SPEED STEPPER MOTOR STALL DETECTION

(75) Inventor: Ronald Paul Russ, Farmington Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 360 days.

(21) Appl. No.: 11/968,871

(22) Filed: Jan. 3, 2008

(65) Prior Publication Data

US 2009/0174358 A1 Jul. 9, 2009

(51) Int. Cl.
*G05B 19/40* (2006.01)
(52) U.S. Cl. .................. 318/685; 318/696; 318/282
(58) Field of Classification Search ............ 318/685, 318/696, 282; 360/78.13
See application file for complete search history.

(56) References Cited

U.S. PATENT DOCUMENTS

| 4,496,892 A * | 1/1985 | Bugatto, Jr. ............ 318/696 |
| 6,861,817 B2 | 3/2005 | Pigott et al. |
| 7,170,254 B2 | 1/2007 | Yamada |

* cited by examiner

*Primary Examiner*—Karen Masih
(74) *Attorney, Agent, or Firm*—Fraser Clemens Martin & Miller LLC; J. Douglas Miller

(57) ABSTRACT

A detector device and a method for detecting a stall condition in a stepper motor, wherein the accumulated value of the back EMF is compared to a stall threshold when the stepper motor has exceeded a pre-determined rotational velocity threshold, the accumulated value of the back EMF representing a condition of the stepper motor, specifically a failure of the accumulated back EMF value to exceed the stall threshold indicating a stall condition of the stepper motor.

19 Claims, 5 Drawing Sheets

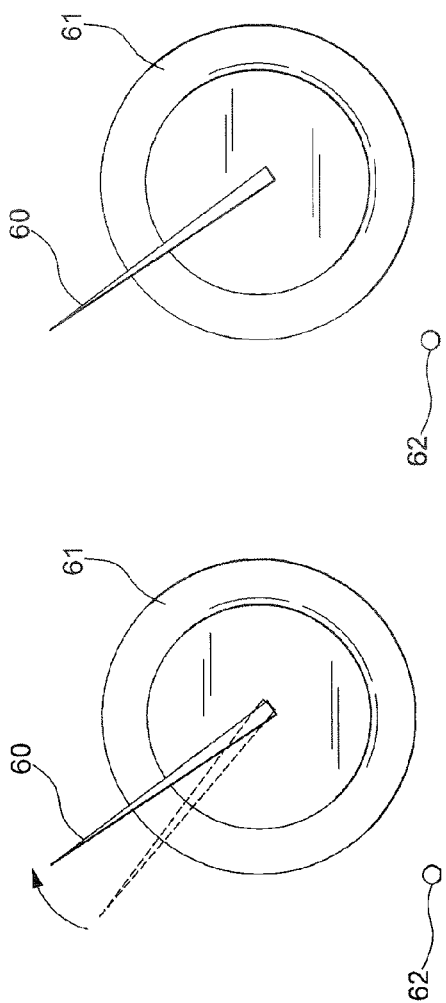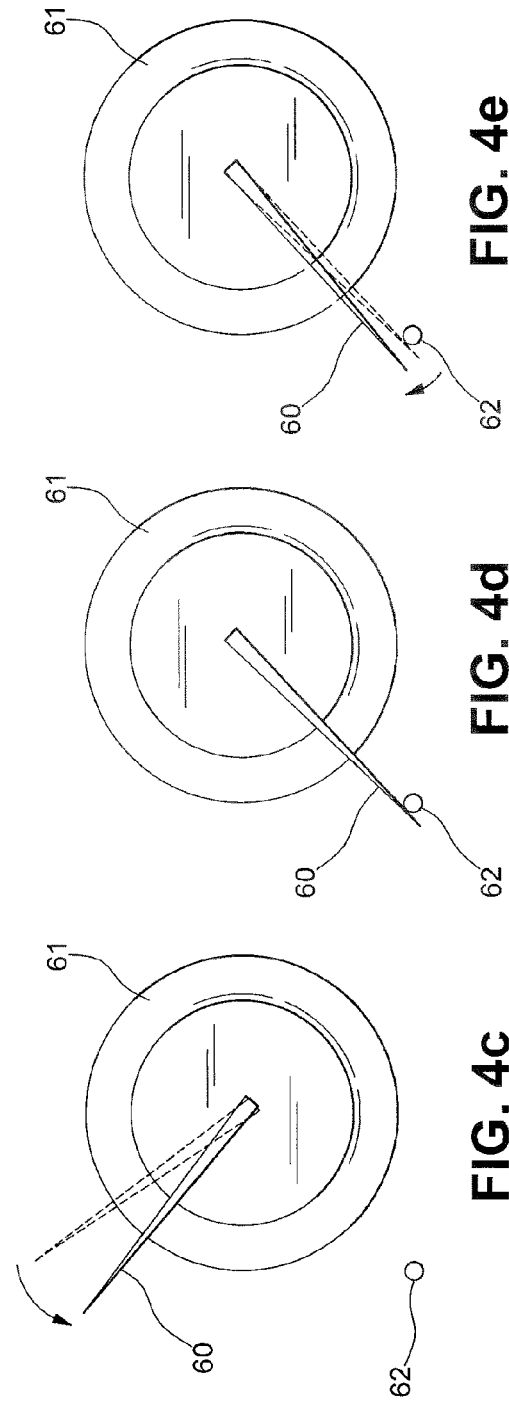

METHOD AND APPARATUS FOR HIGH SPEED STEPPER MOTOR STALL DETECTION

FIELD OF THE INVENTION

The present invention relates to a stepper motor. More particularly, the invention is directed to a detector device and a method for detecting a stall condition in a stepper motor.

BACKGROUND OF THE INVENTION

Stepper motors are typically used in automotive instrument clusters to convey information such as vehicle speed, engine RPM, fuel level, and engine temperature to the driver. The stepper motor is open loop controlled, i.e. a signal is applied to the motor to move it but the absolute position is not known at any one time. In order to know the position of the stepper motor, a referencing operation is required.

Original methods of seeking a reference position in a stepper motor consisted of moving the motor towards a reference point at a certain velocity for a predefined period of time to ensure that the stepper motor with an attached pointer has reached a zero position. Then the motor can be positioned using a series of command sequences designed not to lose position in the stepper motor. One of the issues with this method is that if the pointer is near the pointer stop then the pointer has a tendency to bounce off of the pointer stop.

With the advent of back ElectroMotive Force (EMF) detection, the pointer stop reference position can be detected by watching for the back EMF signal to be reduced below a predetermined level. In order to provide accurate reference detection, the rotational velocity used with this method can still be slow (under 100 degrees per second) and time consuming.

It would be desirable to have a detector device and a method for detecting a stall condition in a stepper motor, wherein the detector device and method provide a means for high speed stepper motor stall detection using rotational velocities of the stepper motor in the range of 200 to 300 degrees per second.

SUMMARY OF THE INVENTION

Concordant and consistent with the present invention, a detector device and a method for detecting a stall condition in a stepper motor, wherein the detector device and method provide a means for high speed stepper motor stall detection using rotational velocities of the stepper motor in the range of 200 to 300 degrees per second, has surprisingly been discovered.

In one embodiment, a detector device comprises an input adapted to receive a back EMF signal of a stepper motor, a programmable function means, wherein the programmable function means controls a detection of a value of a rotational velocity of the stepper motor wherein the velocity value exceeds a predetermined velocity value threshold and initiates a comparison of the back EMF signal to a stall threshold value and a detection of a value of the back EMF signal, wherein the back EMF signal value is compared to the stall threshold value, and an output adapted to transmit an output signal based upon the comparison of the second value of the back EMF signal and the stall threshold value.

The invention also provides methods for detecting a condition in a stepper motor.

One method comprises the steps of rotating a rotor of the stepper motor to a desired initial step state, stopping the rotation of the stepper motor rotor for a pre-determined period of time, accelerating the stepper motor in rotational motion, receiving an input signal from the stepper motor representing a condition of the stepper motor, detecting a value of rotational velocity of the stepper motor rotor, wherein the velocity value exceeds a predetermined velocity value threshold and initiates a comparison of the input signal to a stall threshold value, detecting a value of the input signal, wherein the input signal value is compared to the stall threshold value, and transmitting an output signal to a drive circuit, wherein the output signal indicates the condition of the stepper motor based upon whether the input signal value exceeds the stall threshold value.

Another method comprises the steps of providing a stepper motor including at least a first coil and a second coil and a magnetic rotor, the magnetic rotor having a plurality of magnetic poles, providing an electric current for alternately driving the first coil and the second coil, wherein a back EMF signal is induced in an undriven one of the coils by the driving of a driven one of the coils, rectifying the back EMF signal of the undriven coil, integrating the rectified back EMF signal, rotating the stepper motor rotor to a desired initial step state, stopping the rotation of the stepper motor rotor for a predetermined period of time, accelerating the stepper motor in rotational motion, detecting a value of the rotational velocity of the stepper motor rotor, wherein the velocity value exceeds a predetermined velocity value threshold and initiates a comparison of the rectified and integrated back EMF signal to a stall threshold value, detecting a value of the rectified and integrated back EMF signal, wherein the rectified and integrated back EMF signal value is compared to the stall threshold value, and transmitting an output signal to a drive circuit, wherein the output signal indicates the condition of the stepper motor based upon whether the rectified and integrated back EMF signal value exceeds the stall threshold value.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which:

FIGS. 4a, 4b, 4c, 4d, and 4e are sequential diagrams illustrating the rotational motion of an instrument pointer according to an embodiment of the present invention.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
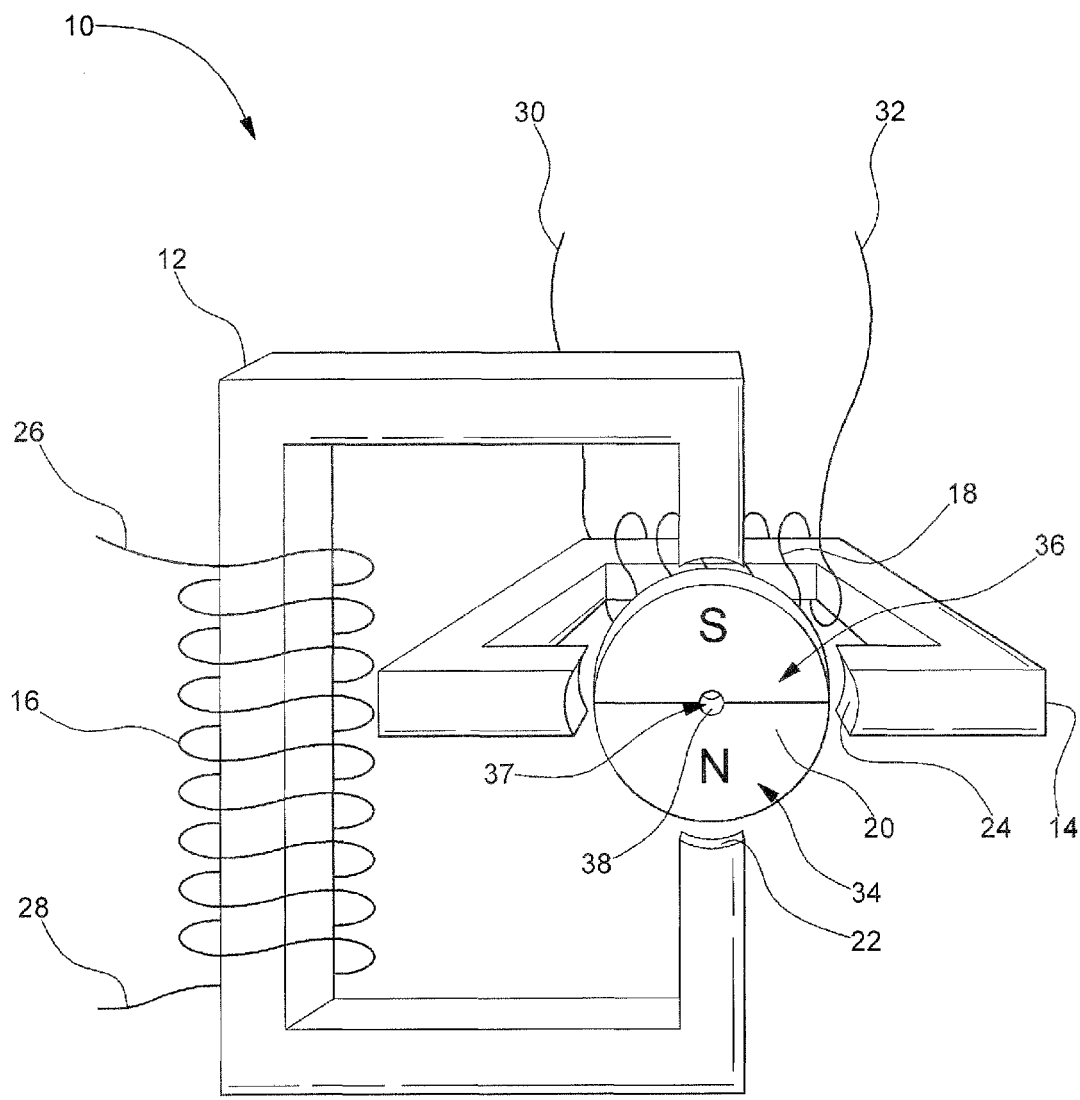
FIG. 1 is a front perspective view of a stepper motor known in the art.

FIG. 1 shows a stepper motor 10 according to the prior art. As shown, the stepper motor 10 includes a first conductive core 12, a second conductive core 14, first inductive coil 16, a second inductive coil 18, and a permanent magnet 20. It is understood that the stepper motor 10 may include any number of conductive cores and coil windings, as desired.

The first conductive core 12 may be formed from any conductive material such as metal, for example. The first conductive core 12 is disposed adjacent the permanent magnet 20, wherein the permanent magnet 20 is free to rotate. As shown, the first conductive core 12 includes a first conductive core aperture 22, the permanent magnet 20 disposed therein. Although the first conductive core 12 is shown having a rectangular shape, it is understood that the first conductive core 12 may have any shape and size, as desired.

The second conductive core 14 may be formed from any conductive material such as metal, for example. The second conductive core 14 is disposed adjacent the permanent magnet 20, wherein the permanent magnet 20 is free to rotate. As shown, the second conductive core 14 includes a second conductive core aperture 24, the permanent magnet 20 disposed therein. Although the second conductive core 14 is shown having a rectangular shape, it is understood that the second conductive core 14 may have any shape and size, as desired.

The first inductive coil 16 may be formed from any conductive material such as metal, for example. The first inductive coil 16 includes a first inductive coil first lead 26 and a first inductive coil second lead 28. Each lead 26, 28 is adapted for electrical communication with a source of electrical energy (not shown). The first inductive coil 16 is wound around at least a portion of the first conductive core 12. It is understood that the first inductive coil 16 may have any number of turns or windings.

The second inductive coil 18 may be formed from any conductive material such as metal, for example. The second inductive coil 18 includes a second inductive coil first lead 30 and a second inductive coil second lead 32. Each lead 30, 32 is adapted for electrical communication with a source of electrical energy. The second inductive coil 18 is wound around at least a portion of the second conductive core 14. It is understood that the second inductive coil 18 may have any number of turns or windings.

The permanent magnet 20, also referred to as a magnetic rotor, is shown as a magnetic disk having a first magnetic pole 34 and a second magnetic pole 36. It is understood that the permanent magnet 20 may have any shape, as desired. It is further understood that the permanent magnet 20 may have any number or orientation of magnet poles, as desired. The permanent magnet 20 is disposed adjacent the first conductive core 12 and the second conductive core 14. The permanent magnetic 20 further includes a rotor shaft 38 having an axis 37, the rotor shaft 38 adapted to control the rotational motion of a secondary device such as an instrument pointer, for example.

Figure 2:
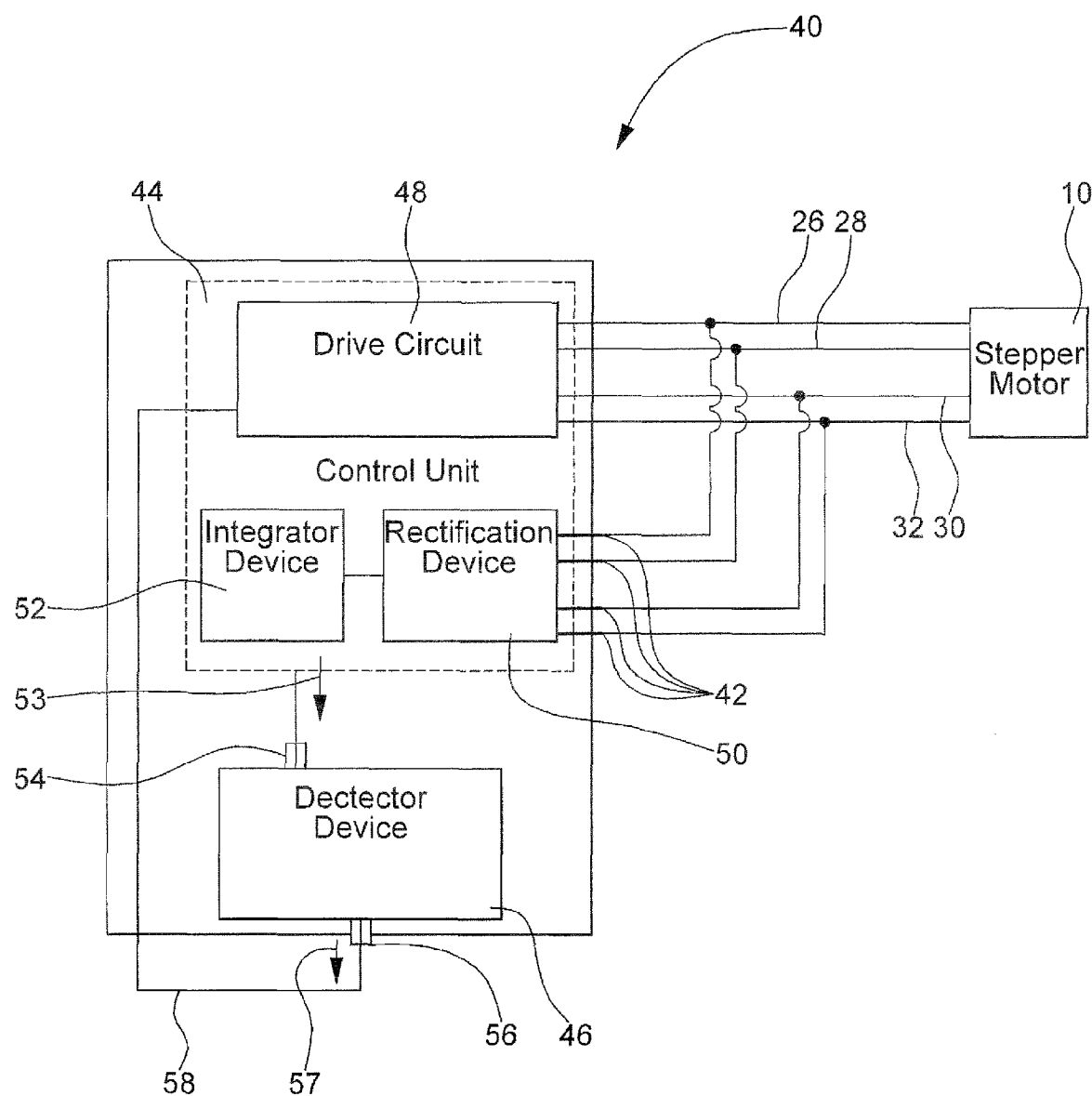
FIG. 2 is a schematic diagram of a programmable control system in electrical communication with a stepper motor according to an embodiment of the present invention.
Figure 3A:
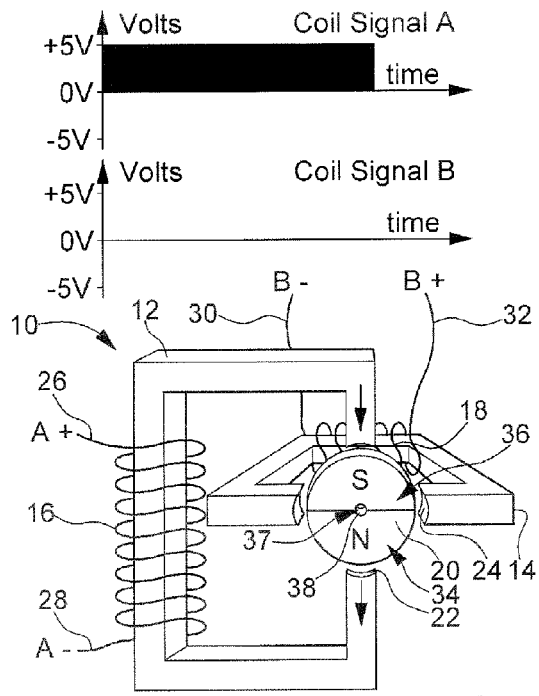
FIGS. 3a, 3b, 3c, and 3d are sequential diagrams illustrating operation of the stepper motor in FIG. 1.
Figure 3B:
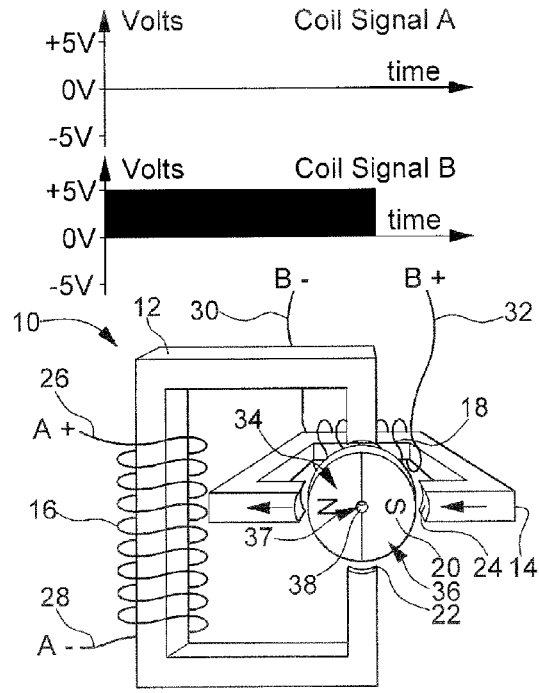
Figure 3C:
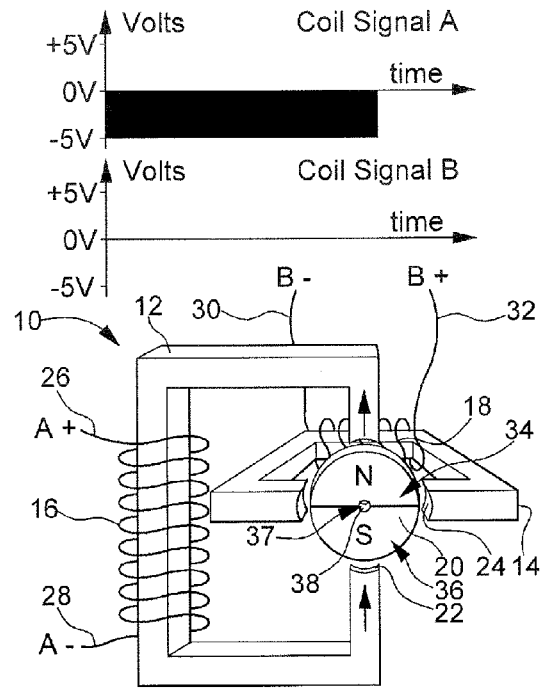
Figure 3D:
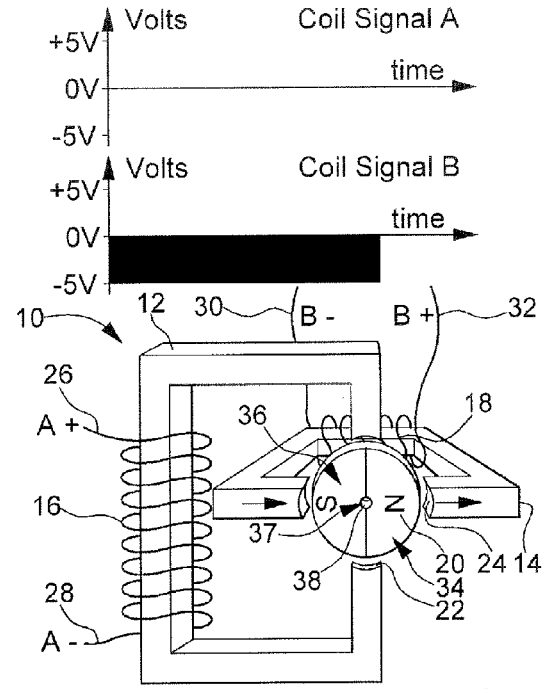

FIG. 2 shows a programmable control system 40 in electrical communication with a stepper motor 10 according to an embodiment of the present invention. The programmable control system 40 includes a plurality of programmable control system inputs 42, a control unit 44, and a detector device 46.

The plurality of programmable control system inputs 42 is adapted to receive an electrical signal such as a sinusoidal or triangular voltage waveform, for example. As shown, the programmable control system inputs 42 are in electrical communication with the stepper motor 10. Although the programmable control system 40 is shown having four programmable control system inputs 42, it is understood that the programmable control system 40 may have any number of programmable control system inputs 42, as desired.

The control unit 44 includes a drive circuit 48, a rectification device 50, and an integrator device 52. The drive circuit 48 is in electrical communication with the plurality of electrical leads 26, 28, 30, 32 of the stepper motor 10. The drive circuit 48 is adapted to provide an electric current to the stepper motor 10. It is understood that the drive circuit 48 may provide electrical communication between the electrical leads 26, 28, 30, 32 of the stepper motor 10 and the source of electrical energy. The rectification device 50 is in electrical communication with the programmable control system inputs 42. The rectification system 50 may be any conventional system for rectifying an electric signal and providing an output signal having a single polarity such as multiplexer circuitry, for example. The integrator device 52 is in electrical communication with the rectification device 50 and the detector device 46. It is understood that the integrator device 52 may be any conventional device, wherein an output signal 53 of the integrator device 52 is proportional to the integral of an input signal of the integrator device 52 such as an operation amplifier integrator, for example.

The detector device 46 includes a detector input 54 and a detector output 56. It is understood that the detector device 46 may be any conventional device for receiving an electrical signal, measuring the electrical signal, and transmitting an output relating to the signal measurement such as a microcomputer, for example. The detector device 46 may further include a programmable function, wherein the function provides measurement and analysis of characteristics of the stepper motor 10 such as rotational velocity and accumulated back EMF, for example. The detector input 54 is in electrical communication with the integrator device 52 of the control unit 44. The detector output 56 is in electrical communication with a feedback loop 58. The detector output 56 is adapted to transmit an output signal 57 of the detector device 46 to the feedback loop 58. As shown, the feedback loop 58 is in electrical communication with the control unit 44, specifically, the drive circuit 48. It is understood that the output signal 57 of the detector device 46 may be transmitted to the drive circuit 48, wherein the output signal 57 is received by the drive circuit 48 to control the rotation of the stepper motor 10. It is further understood that the output signal 57 of the detector device 46 may be transmitted to a display device (not shown), wherein a user may analyze and interpret the output signal 57.

In operation, the drive circuit 48 provides an effective voltage across the first inductive coil 16, wherein the voltage causes an electric current to flow through the first inductive coil 16. As the change in electric current occurs, a magnetic field is induced within the first inductive coil 16. The magnetic field is channeled through the first conductive core 12 toward the permanent magnet 20. When the magnetic field from the first inductive core 16 and the magnetic field from the permanent magnet 20 are not aligned, the permanent magnet 20 will rotate about the axis 37 of the rotor shaft 38. Because opposite magnetic fields attract and like fields repel each other, this rotation continues until the magnetic fields of the permanent magnet 20 have aligned with the opposite pair of magnetic fields from the first inductive coil 16. After the permanent magnet 20 has rotated into the new position, it settles and stops moving. It is understood that to keep the permanent magnet 20 rotating, the magnetic field from both the first inductive coil 16 and the second inductive coil 18 must be changed periodically in a sequence with alternating magnetic fields that keep the permanent magnet 20 in an unstable state and rotating in a desired direction.

FIGS. 3a, 3b, 3c, and 3d show a periodic alteration of the effective voltage across the first inductive coil 16 and the second inductive coil 18, wherein the alteration of the effective voltage induces an alternating magnetic field in the first conductive core 12 and the second conductive core 14. The alternating magnetic fields cause the permanent magnet 20 to rotate about the axis 37 of the rotor shaft 38. The rotation of the permanent magnet 20 causes a change in the magnetic flux through the conductive core 12, 14 of the undriven inductive coil. The undriven inductive coil opposes the change in magnetic field, thereby inducing a current in the undriven coil. The change in the undriven inductive coil current induces a voltage that can be measured across its inductive coil leads 26, 28, 32, 32. This induced voltage is referred to as the back electro-motive-force (EMF).

The back EMF signal is transmitted to the rectification device 50. The back EMF signal is rectified and transmitted to the integrator device 52. The integral of the rectified back EMF signal, with respect to time, is transmitted as the output signal 53 of the integrator device 52. It is understood that the stepper motor 10 operation may be interrupted by a reset function. The reset function sets the stepper motor 10 to a predetermined value for initialization of stall detection. It is understood that the reset function may be performed at any desired time. It is further understood that the stepper motor 10 may be set to any predetermined position, as desired. After the reset function is initialized, the drive circuit 48 provides substantially zero current to the stepper motor for a pre-determined period of time. The substantially zero current allows any motion in the instrument pointer 60 to settle out.

FIGS. 4a, 4b, 4c, 4d, and 4e show a sequence of a method for detecting a condition of a stepper motor 10 according to an embodiment of the present invention. The drive circuit 48 drives the stepper motor 10, the stepper motor 10 thereby rotates an instrument pointer 60 of an instrument gauge 61 to a desired step state as shown in FIG. 4a. It is understood that the step state may be any stepper motor 10 state such as the previous whole step state, for example. The instrument pointer 60 is held in the desired step state for a predetermined period of time as shown in FIG. 4b. The instrument pointer 60 is then accelerated toward an instrument pointer stop 62 at approximately 4000 degrees/second$^2$ as shown in FIG. 4c. It is understood that the rate of acceleration may be any rate, as desired. The detector device 48 is pre-programmed to initiate detection of a stall condition when the stepper motor 10 has a rotational velocity of 99 degrees/second or more. It is understood that the initiation velocity of the detector device 48 may be adjusted, as desired. Once the detector device 48 is initiated, the output signal 53 of the integrator device 52 is sampled, measured, and compared to a pre-determined stall threshold. When the sampled accumulated value of the output signal 53 of the integrator device 52 drops below the stall threshold, a stop is detected. It is understood that a stop is detected when the stepper motor 10 is in a stall condition such as when the instrument pointer 60 is rotated into an instrument pointer stop 62 as shown in FIG. 4d, for example. When a stop is detected, the stepper motor 10 is reversed for a pre-determined time to militate against any bounce back from the instrument pointer 60 making contact with the instrument pointer stop 62. The post-stall reverse rotation of the instrument pointer 60, as shown in FIG. 4e, is known as a 'catch-it' operation and may be set to any degree of rotation, as desired. If a stop is not detected within 270 degrees of single-direction rotation, an error signal is transmitted from the detector device 46 to the drive circuit 48. It is understood that the error signal may be transmitted to a secondary electronic device such as an analyzer and monitor, for example.

Figure 5:
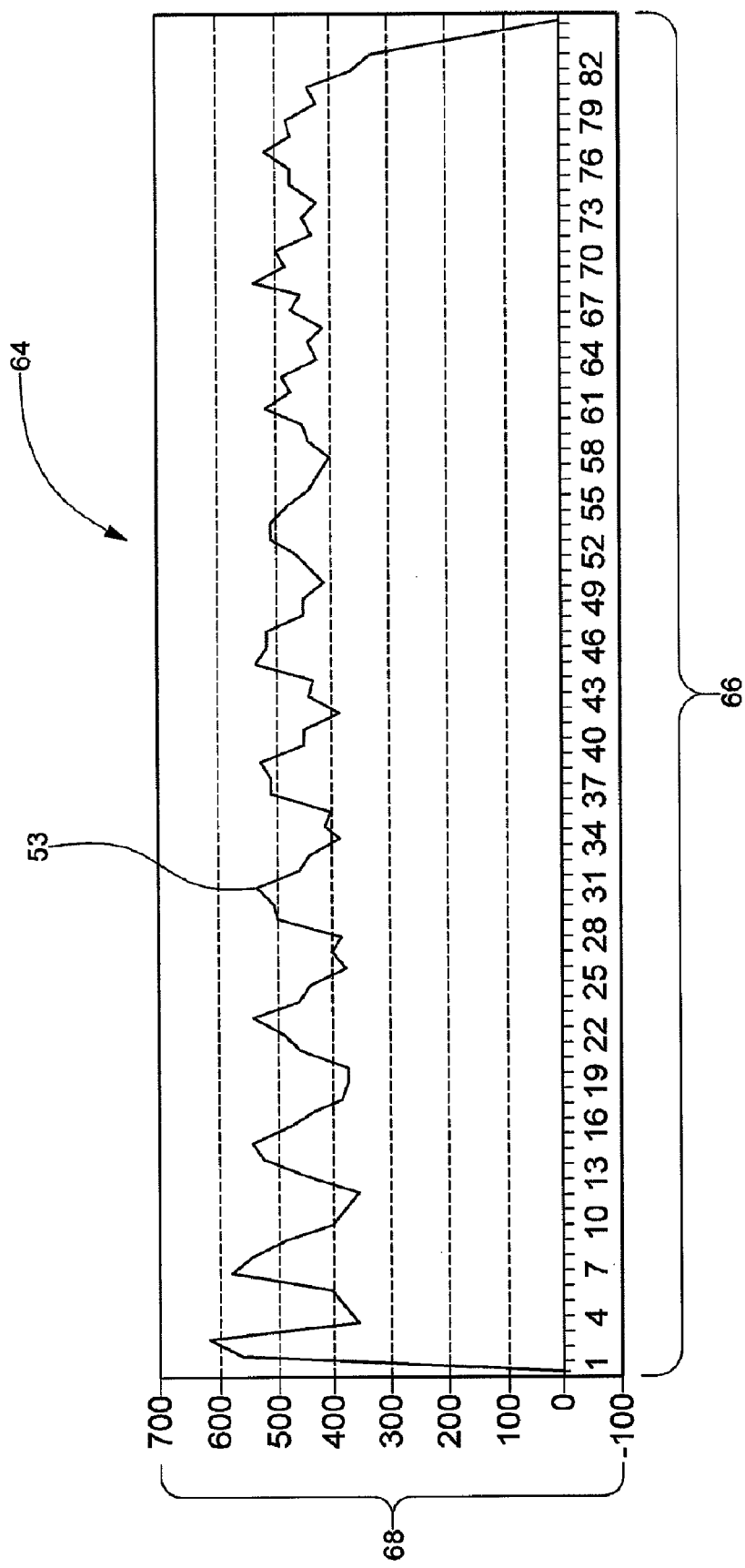
FIG. 5 is a plot of an integral of the back EMF signal according to an embodiment of the present invention.

FIG. 5 shows a graphical plot 64 of the output signal 53 of the integrator device 52 according to an embodiment of the present invention. As shown, the X-axis 66 of the graphical plot represents degrees of rotation of the stepper motor 10 and the Y-axis 68 of the graphical plot represents the accumulated value of the output signal 53 of the integrator device 52 in mV. The output signal 53 of the integrator device 52 is transmitted to the detector device 46, wherein the detector device 46 samples, measures, and compares the output signal 53 to the stall threshold. As a non-limiting example, the stall threshold is 57 mV.

The detector device 46 and method according to the present invention provide an efficient means for high-speed detection of a condition of the stepper motor 10. The detector device 46 and method according to the present invention detects a condition of a stepper motor 10 using rotational velocities of the stepper motor 10 in the range of 200 to 300 degrees per second. Further, the catch-it operation provides a means for high speed stall detection while militating against any errors associated with the instrument pointer 60 bouncing off an instrument pointer stop 62.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for detecting a condition of a stepper motor, the method comprising the steps of:
   rotating a rotor of the stepper motor to a desired initial step state;
   stopping the rotation of the stepper motor rotor for a pre-determined period of time;
   accelerating the stepper motor in rotational motion;
   receiving an input signal from the stepper motor representing a condition of the stepper motor;
   detecting a value of rotational velocity of the stepper motor rotor, wherein the velocity value exceeds a predetermined velocity value threshold and initiates a comparison of the input signal to a stall threshold value;
   detecting a value of the input signal, wherein the input signal value is compared to the stall threshold value; and
   transmitting an output signal to a drive circuit, wherein the output signal indicates the condition of the stepper motor based upon whether the input signal value exceeds the stall threshold value.

2. The method according to claim 1, wherein the input signal is a rectified integral of a back EMF signal of the stepper motor.

3. The method according claim 1, further comprising the step of providing the stepper motor including at least a first coil, a second coil and a magnetic rotor, the magnetic rotor having a plurality of magnetic poles.

4. The method according to claim 3, further comprising the step of providing an electric current for alternatingly driving the first coil and the second coil, wherein a back EMF signal is induced in an undriven one of the coils by the driving of a driven one of the coils.

5. The method according to claim 2, further comprising the step of rectifying the back EMF signal.

6. The Method according claim 2, further comprising the step of integrating the back EMF signal.

7. The method according to claim 1, wherein a failure to detect the input signal value exceeding the stall threshold indicates a stall condition of the stepper motor.

8. The method according to claim 7, further comprising the step of reversing the rotation of the stepper motor for a pre-determined period of time when the input signal value indicates a stall condition of the stepper motor.

9. A method for detecting a condition of a stepper motor, the method comprising the steps of:
- providing a stepper motor including at least a first coil and a second coil and a magnetic rotor, the magnetic rotor having a plurality of magnetic poles;
- providing an electric current for alternately driving the first coil and the second coil, wherein a back EMF signal is induced in an undriven one of the coils by the driving of a driven one of the coils;
- rectifying the back EMF signal of the undriven coil;
- integrating the rectified back EMF signal;
- rotating the stepper motor rotor to a desired initial step state;
- stopping the rotation of the stepper motor rotor for a pre-determined period of time;
- accelerating the stepper motor in rotational motion;
- detecting a value of the rotational velocity of the stepper motor rotor, wherein the velocity value exceeds a pre-determined velocity value threshold and initiates a comparison of the rectified and integrated back EMF signal to a stall threshold value;
- detecting a value of the rectified and integrated back EMF signal, wherein the rectified and integrated back EMF signal value is compared to the stall threshold value; and
- transmitting an output signal to a drive circuit, wherein the output signal indicates the condition of the stepper motor based upon whether the rectified and integrated back EMF signal value exceeds the stall threshold value.

10. The method according to claim 9, wherein a failure to detect the rectified and integrated back EMF signal value exceeding the stall threshold indicates a stall condition of the stepper motor.

11. The method according to claim 10, further comprising the step of reversing the rotation of the stepper motor for a predetermined period of time when the rectified and integrated back EMF signal value indicates a stall condition of the stepper motor.

12. A detector device comprising:
- an input adapted to receive a back EMF signal of a stepper motor;
- a programmable function means, wherein the programmable function means controls:
  - a detection of a value of a rotational velocity of the stepper motor wherein the velocity value exceeds a predetermined velocity value threshold and initiates a comparison of the back EMF signal to a stall threshold value; and
  - a detection of a value of the back EMF signal, wherein the back EMF signal value is compared to the stall threshold value, and wherein a failure to detect the back EMF signal value exceeding the stall threshold indicates a stall condition of the stepper motor; and
- an output adapted to transmit an output signal based upon the comparison of the back EMF signal value and the stall threshold value.

13. The detector device according to claim 12, wherein the pre-determined velocity value threshold is greater than 99 degrees/second.

14. The detector device according to claim 12, wherein the output signal is transmitted to a drive circuit, the drive circuit reversing the rotation of the stepper motor for a predetermined period of time when the back EMF signal value indicates a stall condition of the stepper motor.

15. The detector device according to claim 12, wherein the output transmits an error signal representing a failure of the back EMF signal value to fall below the stall threshold through 270 degrees of single-direction rotation.

16. The detector device according to claim 12, wherein the back EMF signal is a rectified signal.

17. The detector device according to claim 12, wherein the back EMF signal is an integrated signal.

18. The detector device according to claim 12, further comprising a means for rectifying the back EMF signal and a means for integrating the back EMF signal with respect to time.

19. The detector device according to claim 12, further comprising a means for analyzing the output signal in electrical communication with the output of the detector device.

* * * * *